(12) United States Patent
Watanabe

(10) Patent No.: US 12,253,113 B2
(45) Date of Patent: Mar. 18, 2025

(54) GREASE-SEALED BEARING

(71) Applicant: NTN CORPORATION, Osaka (JP)

(72) Inventor: Kota Watanabe, Mie (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 18/026,573

(22) PCT Filed: Sep. 13, 2021

(86) PCT No.: PCT/JP2021/033500
§ 371 (c)(1),
(2) Date: Mar. 15, 2023

(87) PCT Pub. No.: WO2022/059638
PCT Pub. Date: Mar. 24, 2022

(65) Prior Publication Data
US 2023/0332646 A1    Oct. 19, 2023

(30) Foreign Application Priority Data

Sep. 16, 2020  (JP) ................. 2020-155899

(51) Int. Cl.
*F16C 33/66* (2006.01)
*C10M 115/10* (2006.01)
(Continued)

(52) U.S. Cl.
CPC ....... *F16C 33/6633* (2013.01); *C10M 115/10* (2013.01); *C10M 169/02* (2013.01);
(Continued)

(58) Field of Classification Search
CPC .. F16C 19/163; F16C 19/166; F16C 33/6633; F16C 33/78; F16C 2322/59;
(Continued)

(56) References Cited

U.S. PATENT DOCUMENTS 9,090,848 B2    7/2015  Nogami et al.
2015/0252283 A1 9/2015  Sekiguchi et al.
(Continued)

FOREIGN PATENT DOCUMENTS

CN  103476911 A   12/2013
CN  104769087 A   7/2015
(Continued)

OTHER PUBLICATIONS

Machine translation of JP 2006-316850 A dated Nov. 24, 2006.
(Continued)

*Primary Examiner* — Phillip A Johnson
(74) *Attorney, Agent, or Firm* — Hedman & Costigan, P.C.; James V. Costigan; Kathleen A. Costigan

(57) ABSTRACT

To provide a grease-sealed bearing that is superior in fretting wear resistance and sealing performance when used under an oscillation condition with acceleration and deceleration such as a condition used in a robot joint. A grease-sealed bearing 1 includes an inner ring 2 and an outer ring 3 that are raceway rings, a plurality of rolling elements 4 interposed between the inner ring 2 and the outer ring 3, and a grease composition 7 sealed around the rolling elements 4. The bearing oscillates such that a bearing rotational direction changes while accelerating and decelerating. The grease composition contains a base oil and a thickener. The worked penetration of the grease composition is 310 or more. The thickener is a calcium sulfonate complex soap.

6 Claims, 4 Drawing Sheets

(51) Int. Cl.
*C10M 169/02* (2006.01)
*F16C 33/78* (2006.01)
*C10N 40/02* (2006.01)
*C10N 50/10* (2006.01)

(52) U.S. Cl.
CPC ............... *C10M 2203/003* (2013.01); *C10M 2219/0445* (2013.01); *C10N 2040/02* (2013.01); *C10N 2050/10* (2013.01)

(58) Field of Classification Search
CPC ............ C10M 115/10; C10M 169/02; C10M 2203/003; C10M 2219/0445; C10N 2040/02; C10N 2050/10
See application file for complete search history.

(56) References Cited

U.S. PATENT DOCUMENTS

| | | | | |
|---|---|---|---|---|
| 2016/0160923 | A1* | 6/2016 | Kawamura | C10M 105/04 384/462 |
| 2018/0283518 | A1* | 10/2018 | Kataoka | F16C 19/163 |
| 2019/0127656 | A1* | 5/2019 | Farng | C10M 149/22 |

FOREIGN PATENT DOCUMENTS

| | | | | |
|---|---|---|---|---|
| EP | 1811012 A1 * | 7/2007 | | C10M 169/06 |
| EP | 2698420 A1 | 2/2014 | | |
| EP | 2921549 A1 | 9/2015 | | |
| JP | 2002-180077 A | 6/2002 | | |
| JP | 2004099847 A * | 4/2004 | | F16C 33/6633 |
| JP | 2006029473 A * | 2/2006 | | C10M 169/02 |
| JP | 2006-316850 A | 11/2006 | | |
| JP | 2008256086 A * | 10/2008 | | F16C 19/163 |
| JP | 2015-160493 A | 9/2015 | | |
| KR | 1020140035901 A | 3/2014 | | |
| WO | 2012141222 A1 | 10/2012 | | |
| WO | 2014-077090 A1 | 5/2014 | | |
| WO | WO-2018192357 A1 * | 10/2018 | | C10M 115/10 |

OTHER PUBLICATIONS

Machine translation of JP 2002-180077 A dated Jun. 26, 2002.
Machine translation of JP 2015-160493 A dated Sep. 7, 2015.
Machine translation of abstract of CN 103476911 A dated Dec. 25, 2013.
Machine translation of KR 1020140035901 A dated Mar. 24, 2014 is not available; the abstract from the corresponding document EP2698420 A1 is provided.
Machine translation of abstraact of CN 104769087 A dated Jul. 8, 2015.
Hajime Kojima, Characteristics and Practical Applications of Calcium Sulfonate Complex Grease, Journal of Japanese Society of Tribologists, 2013, vol. 58, Issue 11, pp. 817-823.
Mechanical Translation of text of—Hajime Kojima, Characteristics and Practical Applications of Calcium Sulfonate Complex Grease, Journal of Japanese Society of Tribologists, 2013, vol. 58, Issue 11, pp. 817-823.

* cited by examiner (a) Low surface pressure (b) High surface pressure

GREASE-SEALED BEARING

TECHNICAL FIELD

The present invention relates to a grease-sealed bearing in which a grease composition (hereinafter, merely referred to as "grease") is sealed, in particular relates to a grease-sealed bearing used for industrial machines such as a robot joint.

BACKGROUND ART

Various industrial robots for assembling, welding and coating have been used in a manufacturing line of industrial products such as a vehicle. In order to reduce a cycle time for the sake of improvement of productivity, operation speed of the robot tends to increase. The operation of the robot is not a continuous rotation but an intermittent movement. When the operation speed increases, in a rolling bearing used in a rotational part such as a joint part of a robot arm (hereinafter, referred to as a robot joint bearing), a switching number per unit time of operations of stopping, activating, driving, and stopping is increased and thus the acceleration and the deceleration applied to the rolling bearing in each switching is increased. Accordingly, sliding caused in the bearing becomes larger. The sliding in the bearing easily causes break of oil film between a rolling element and a raceway ring and also local wear called fretting wear on a surface of the rolling element or raceway surfaces of inner and outer rings. The raceway ring means the inner ring and the outer ring.

Patent Document 1 discloses a technique that reduces the fretting wear by improving the grease. In Patent Document 1, the rolling element is formed of ceramics, a carbonitriding treatment as a thermal treatment is applied to the raceway ring, and a urea compound is employed as a thickener for the grease sealed in a bearing space. Thus, minute sliding of the rolling element is suppressed and sufficient oil film is formed even when the minute sliding is caused on the rolling element due to the switching between normal and reverse minute rotations. As a result, the fretting wear between the rolling element and the raceway ring is suppressed.

Patent Document 2 discloses a grease for preventing the fretting wear. The grease is formed by compounding a urea compound having a specified structure as a thickener, with non-ester oil containing synthetic hydrocarbon oil as a base oil. Specifically, the grease contains the urea compound having a specified structure and the synthetic hydrocarbon oil having the dynamic viscosity of 20-80=m$^2$/s at 40° C. by 50 mass % relative to the whole of the base oil, so as to suppress the fretting wear.

PRIOR ART DOCUMENTS

Patent Documents

Patent Document 1: JP 2006-316850 A
Patent Document 2: JP 2002-180077 A

Non-Patent Document

Non-Patent Document 1: Hajime Kojima, Journal of Japanese Society of Tribologists, vol. 58, no. 11, 2013, p. 817-823

SUMMARY OF THE INVENTION

Problems to be Solved by the Invention

The robot operates while a plurality of joints is intermittently and rapidly accelerating or decelerating, and thus a large load such as a radial load, an axial load and a moment is applied to the joint of the robot. Since high rotational accuracy and high positional accuracy are required to a bearing for robot joints, the bearing needs high rigidity to maintain a shape of the bearing and keep the rotational axis when the large load is applied thereto. The high rigidity of the bearing is secured by preloading to the bearing, however since the raceway ring and the rolling element come into contact with each other with high surface pressure, the break of the oil film (lubrication failure) might be easily caused in the contact areas.

Further, the robot operates precisely and thus the bearing may cause an oscillation movement in which a rotational direction changes with a small angle between a normal direction and a reverse direction. Also when the bearing causes the oscillation movement with a small angle, the grease is pushed out from the contact areas between the rolling element and the raceway ring, so that the break of the oil film might be caused easily. The break of the oil film in the contact areas may cause the fretting wear, and thus the robot joint bearing is required to have superior fretting wear resistance.

The grease-sealed bearing disclosed in Patent Document 1 improves the fretting wear resistance by employing ceramics in the rolling element, applying a carbonitriding treatment to the raceway ring, and employing a urea compound as a grease sealed in a bearing space. However, in a case in which the rolling element is formed of ceramics and the carbonitriding treatment is applied to the raceway ring, the cost becomes high because the ceramics is high in cost and the surface treatment needs time and processing cost.

The bearing disclosed in Patent Document 2 employs a grease containing a urea compound as a thickener and having the worked penetration of 220-280 and thus the flowability thereof is relatively low. In the fretting wear evaluation in the example, the axial load is set to 2,450 N (calculated contact surface pressure of approximately 1,700 MPa). This is relatively low surface pressure compared to the surface pressure normally applied to a robot joint bearing. Thus, in a case in which the bearing is used as a robot joint bearing under a large surface pressure condition or an oscillation condition, the fretting wear resistance might not be sufficiently obtained because a lack of a flow of the grease to the contact areas between the rolling element and the raceway ring.

The robot is used in various usages, in particular the robot may be used in a clean environment such as in a clean room. Thus, the robot joint bearing is also required not to contaminate the periphery thereof. Accordingly, it is important to secure a sealing performance that prevents the leakage of the sealed grease from the inside of the bearing.

An object of the present invention is, in order to solve such problems, to provide a grease-sealed bearing having superior fretting wear resistance and sealing performance when used under an oscillation condition with acceleration and deceleration such as a condition used in a robot joint bearing.

Means for Solving the Problems

A grease-sealed bearing of the present invention includes an inner ring and an outer ring that are raceway rings, a plurality of rolling elements that is interposed between the inner ring and the outer ring, and a grease composition that is sealed around the rolling elements. The bearing is configured to oscillate such that a rotational direction of the bearing changes while accelerating and decelerating. The grease composition contains a base oil and a thickener. The worked penetration of the grease composition is 310 or more. The thickener is a calcium sulfonate complex soap.

The "worked penetration" is a 60-stroke worked penetration based on JIS K 2220.

The grease-sealed bearing may be used under a high load condition in which the maximum contact surface pressure on the raceway ring is 2,000 MPa or more and under a condition less than a critical oscillation angle.

The "critical oscillation angle" is an actually usable minimum oscillation angle of the bearing, or the minimum oscillation angle that corresponds to the rated lifetime and that is determined by the number of the rolling elements in mainly a single row in an internal design of the bearing. The critical oscillation angle in a case in which the bearing is configured as an angular contact ball bearing is described with reference to FIG. 4. FIG. 4 is a simple sectional view in a radial direction of an angular contact ball bearing having a contact angle α. In a case in which the inner ring oscillates, the critical oscillation angle is represented by the following formula.

$$\text{Critical oscillation angle} = (360°/Z) \times (Dpw/(Dpw-Dw \cos \alpha))$$

In the above-described formula, Z denotes the number of balls 24 that are rolling elements in a single row of a single-row angular contact ball bearing 20. In FIG. 4, Dpw denotes a pitch circular radius of the ball 24, Dw denotes a diameter of the ball 24, and a denotes a contact angle. In a case in which the outer ring oscillates, a denominator of the right side in the formula is $(Dpw+Dw \cos \alpha)$.

The worked penetration may be in a range of 310-340. Further, the base oil may be a mineral oil or a synthetic hydrocarbon oil.

The grease-sealed bearing may be configured as an angular contact ball bearing. Further, the grease-sealed bearing may be configured as a robot joint bearing.

Effect of the Invention

The grease-sealed bearing of the present invention includes the inner ring and the outer ring that are the raceway rings, a plurality of the rolling element that is interposed between the inner ring and the outer ring, and the grease composition that is sealed around the rolling elements. The bearing is configured to oscillate such that a rotational direction of the bearing changes while accelerating and decelerating. The grease composition contains the base oil and the thickener. The worked penetration of the grease composition is 310 or more. The thickener is the calcium sulfonate complex soap. With this, superior flowability of the grease to contact areas (raceway surfaces) between the rolling element and the raceway ring can be obtained, and the worked penetration when the bearing oscillates can be prevented from increasing. Thus, superior fretting wear resistance can be obtained by suppressing the fretting wear and superior sealing performance can be obtained by suppressing the leakage of the grease even when used under an oscillation condition with acceleration and deceleration such as a condition used in a robot joint bearing.

By employing the calcium sulfonate complex soap as the thickener, the thickener film that resists a high load is formed on the raceway surface, so that the bearing can be applied to a usage with high contact surface pressure on the raceway ring. Further, the fretting wear resistance can be improved by adjusting the grease without using a raceway ring subjected to a specified surface treatment or using a ceramic rolling element, and thus the cost of the whole of the bearing can be reduced.

The grease-sealed bearing has sufficient fretting wear resistance and sealing performance under a high load condition in which the maximum contact surface pressure on the raceway ring is 2,000 MPa or more and under a condition less than a critical oscillation angle, which are conditions generally causing the fretting wear and the leakage of the grease easily.

By setting the worked penetration of the grease composition in a range of 310-340, the flowability of the grease is restricted in a specified range, so that superior sealing performance can be obtained.

MODE FOR CARRYING OUT THE INVENTION

Figure 1:
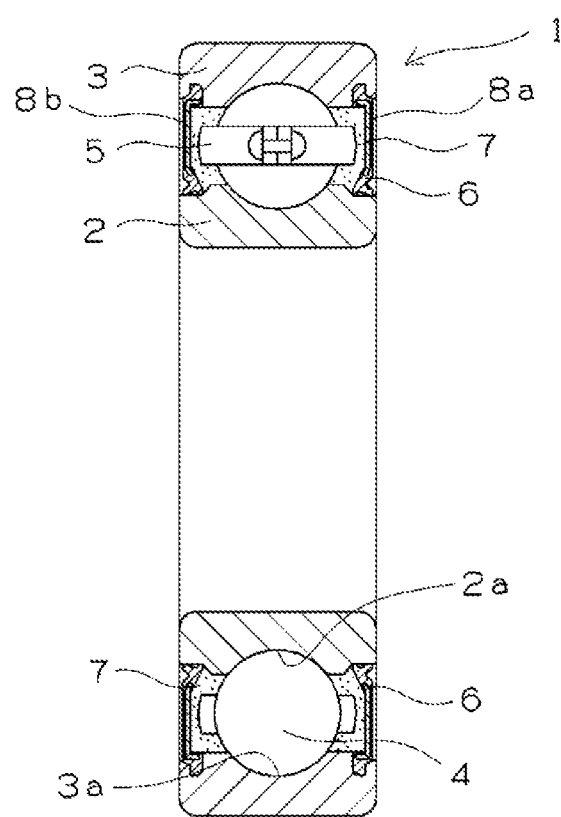
FIG. 1 is a sectional view showing a deep groove ball bearing as an example of a grease-sealed bearing of the present invention.

A grease-sealed bearing of the present invention includes an inner ring and an outer ring that are raceway rings, a plurality of rolling elements interposed between the inner ring and the outer ring, and a grease composition sealed around the rolling elements. The grease-sealed bearing is configured to oscillate such that a rotational direction of the bearing changes while accelerating and decelerating. The oscillation is a motion in which the rotational direction of the bearing changes between a normal direction and a reverse direction. For example, in a robot joint bearing, a switching of operations of stopping, activating, driving, and stopping is performed and thus the bearing causes the oscillation within a specified oscillation angular range. When the switching operation is performed fast, the large acceleration and the large deceleration are applied to the bearing when oscillating, which causes rapid acceleration and deceleration.

The present inventors conducted a study in order to improve the fretting wear resistance and the sealing performance of the grease-sealed bearing in a usage under a condition in which the grease-sealed bearing oscillates while accelerating and decelerating (more severely, a high load condition of the maximum contact surface pressure of 2,000 MPa or more on the raceway ring and a condition less than a critical oscillation angle) such as a condition used in the above-described robot joint bearing. As a result of the study, the present inventors found that both of superior fretting wear resistance and superior sealing performance can be obtained by employing a calcium sulfonate complex soap as a thickener in the grease composition and by setting the worked penetration of the grease composition to 310 or more. The present invention has been derived from such knowledge.

The grease composition used in the grease-sealed bearing of the present invention is now described.

The calcium sulfonate complex soap employed in the present invention is a complex soap formed by combining a calcium sulfonate and a calcium salt other than the calcium sulfonate. The thickener in the grease composition is only the calcium sulfonate complex soap and thus it is preferable that the thickener does not contain a metal soap other than the calcium sulfonate complex soap or a urea compound as the thickener. With this, an interaction between ions in the calcium salt is not affected by other component and the property of the grease is stable for a long time. As a result, the deterioration of the cone penetration of the grease is hardly caused and thus superior sealing performance can be obtained.

Examples of the calcium sulfonate include a calcium salt of alkyl aromatic sulfonic acid such as dodecylbenzenesulfonic acid, octadecylbenzenesulfonic acid, dilaurylcetylbenzenesulfonic acid, dinonylnaphthalenesulfonic acid, paraffin wax substituted benzenesulfonic acid, polyolefin substituted benzenesulfonic acid and polyisobutylene substituted benzenesulfonic acid, a calcium salt of aromatic sulfonic acid, a calcium salt of alkylsulfonic acid, and a calcium salt of petroleum sulfonic acid.

Examples of the calcium salt other than the calcium sulfonate include a calcium salt of inorganic acid such as carbonic acid, boric acid, phosphoric acid, hydrochloric acid and sulfonic acid, a calcium salt of higher fatty acid such as behenic acid, arachidic acid, stearic acid, hydroxystearic acid, hexadecanoic acid and octanoic acid, a calcium salt of lower fatty acid such as acetic acid, butyric acid and valeric acid, a calcium salt of inorganic base, and a calcium salt of dibasic fatty acid such as azelaic acid, sebacic acid, adipic acid, glutaric acid, succinic acid, malonic acid and oxalic acid. Any one of the calcium salts other than the calcium sulfonate may be employed alone or a combination of two or more of them may be employed.

The calcium sulfonate complex soap that is synthesized in advance may be dispersed into the base oil, or the calcium sulfonate complex soap may be dispersed into the base oil by being synthesized in the base oil. The latter way is preferable because the manufacturing process can be simplified and the thickener can be favorably dispersed into the base oil.

In a case in which the calcium sulfonate complex soap is synthesized within the base oil, for example, water, calcium hydroxide, higher fatty acid, lower fatty acid, and/or inorganic acid are compounded into the alkyl aromatic sulfonic acid dispersed into the base oil and then water is eliminated by heating, so that the calcium sulfonate complex soap is obtained.

As the base oil employed in the grease composition, the base oil generally used in the rolling bearing can be employed without any limitation. Examples of the base oil include mineral oil such as paraffinic mineral oil and naphthenic mineral oil, synthetic hydrocarbon oil such as PAO oil and alkylbenzene oil, ester oil, ether oil, silicone oil, and fluorine oil. Any one of these base oils may be employed alone or a combination of two or more of them may be employed.

The combination of the base oil and the thickener relates to the interaction between the thickeners in the base oil and thus affects the thickening effect. Accordingly, it is preferable to select an appropriate combination. Considering the calcium sulfonate complex soap employed in the present invention, the mineral oil or the synthetic hydrocarbon oil is preferable as the base oil. The mineral oil is preferable as the base oil from a viewpoint of cost. On the other hand, the synthetic hydrocarbon oil is preferable as the base oil from a viewpoint of lubrication performance at high temperature.

The paraffinic mineral oil is preferable as the mineral oil from a viewpoint of lubrication performance. On the other hand, the naphthenic mineral oil is preferable as the mineral oil from a viewpoint of cost. The preferable mineral oil may be refined by using an appropriate combination of two or more of a vacuum distillation, a lubricant deasphalting, a solvent extraction, a hydrocracking, a solvent dewaxing, a sulfuric acid treatment, a clay refining, and a hydrorefining.

The PAO oil is preferable as the synthetic hydrocarbon oil. The PAO oil is α-olefin or isomerized α-olefin oligomer or polymer compound. Examples of the α-olefin include 1-Octene, 1-Nonene, 1-Decene, 1-Dodecene, 1-Tridecene, 1-Tetradecene, 1-Pentadecene, 1-Hexadecene, 1-Heptadecene, 1-Octadecene, 1-Nonadecene, 1-Eicosene, 1-Docosene, and 1-Tetradocosene. Normally, a mixture of any these α-olefins is employed.

The kinematic viscosity of the base oil (in mixed oil, the kinematic viscosity thereof) at 40° C. is preferably 10-200 $mm^2/s$, more preferably 10-100 $mm^2/s$, further more preferably 30-100 $mm^2/s$.

Other additive (s) may be further compounded to the grease composition of the present invention to such an extent that does not deteriorate the nature of the present invention. Examples of the additives include an antioxidant such as an amine-based compound, a phenol-based compound and a sulfur-based compound, an extreme pressure agent such as a chlorine-based compound, a sulfur-based compound, a phosphorus-based compound and an organic molybdenum, an antirust agent such as a sulfonate salt, polyhydric alcohol ester and sorbitan ester, and an oily agent such as ester and alcohol. The grease-sealed bearing of the present invention is mainly used under a high load condition, and thus the grease composition preferably contains the extreme pressure agent. In a case in which the additive is compounded, the content of the whole of the additive (s) is preferably 5 mass % or less relative to the whole of the grease composition.

The calcium sulfonate complex soap has not only a thickening effect that thickens the base oil by being compounded into the base oil but also a rust preventive effect that prevents rust from causing on metal to be come into contact therewith. Accordingly, since the calcium sulfonate complex soap functions as the thickener and the antirust agent, the grease need not contain separate antirust agent.

The worked penetration of the grease composition is 310 or more. With the grease composition having the worked penetration within this range, superior flowability of the grease to the contact areas between the rolling element and the raceway ring and superior fretting wear resistance can be obtained. The worked penetration of the grease composition is further preferable in a range of 310-340. Within this range, the flowability of the grease is set in a specified range and more superior sealing performance can be obtained.

The grease-sealed bearing of the present invention is described with reference to FIG. 1. FIG. 1 shows a sectional view of a deep groove ball bearing as an example of the grease-sealed bearing. A grease-sealed bearing 1 includes an inner ring 2 having an inner ring raceway surface 2a on an outer peripheral surface thereof, and an outer ring 3 having an outer ring raceway surface 3a on an inner peripheral surface thereof. The inner ring 2 and the outer ring 3 are arranged coaxially with each other. A plurality of rolling elements 4 is disposed between the inner ring raceway surface 2a and the outer ring raceway surface 3a. The rolling elements 4 are retained by a cage 5. Axial end openings 8a, 8b between the inner ring and the outer ring are sealed by seal members 6. The above-described grease composition 7 is sealed around at least the rolling element 4. Each of the inner ring 2, the outer ring 3 and the rolling elements 4 is mainly formed of iron-based metal material. The inner ring 2, the outer ring 3 and the rolling elements 4 are lubricated by the grease composition 7 interposed between the rolling elements 4 and the raceway surfaces.

The iron-based metal material that forms the bearing component such as the inner ring 2, the outer ring 3, the rolling elements 4 and the cage 5 in the grease-sealed bearing 1 is any material generally used as a bearing material. Examples of the iron-based metal material include high carbon chromium bearing steel (SUJ 1, SUJ 2, SUJ 3, SUJ 4, SUJ 5 and the like; JIS G 4805), cement steel (SCr 420, SCM 420 and the like; JIS G 4053), stainless steel (SUS 440C and the like; JIS G 4303), high-speed steel (M 50 and the like), and cold-rolled steel. The seal member 6 may be formed as a single body of metal or rubber molded body, or alternatively the seal member 6 may be formed as a complex body of the rubber molded body and a metal plate, a plastic plate, or a ceramic plate. The complex body of the rubber molded body and the metal plate is preferable from a viewpoint of durability and easiness of adhesion.

In the grease-sealed bearing of the present invention, since the thickener in the grease is a calcium sulfonate complex soap, a thickener film that resists a high load is formed. With this, the grease-sealed bearing can be used under a high load condition of the maximum contact surface pressure of 2,000 MPa or more and a condition less than a critical oscillation angle. Accordingly, the grease-sealed bearing can be applied to a usage that requires high accuracy such as a usage in which the general deep groove ball bearing easily causes fretting wear. The maximum contact surface pressure denotes the maximum value of the surface pressure on the contact surfaces between the raceway ring and the rolling element. The maximum contact surface pressure is preferably 2,300 MPa or more, more preferably 2,700 MPa or more.

The grease-sealed bearing of the present invention may be, for example, an angular contact ball bearing having a contact angle. The preload is applied to the angular contact ball bearing to enhance the rigidity thereof, so that the angular contact ball bearing is used in a usage that requires high accuracy. In the grease-sealed bearing of the present invention, since the thickener is the calcium sulfonate complex soap, the thickener film that resists a high load is formed and thus the break of oil film in the contact area is hardly caused even under a condition in which the high load is applied like an angular contact ball bearing, so that superior fretting wear resistance can be obtained.

Figure 2:
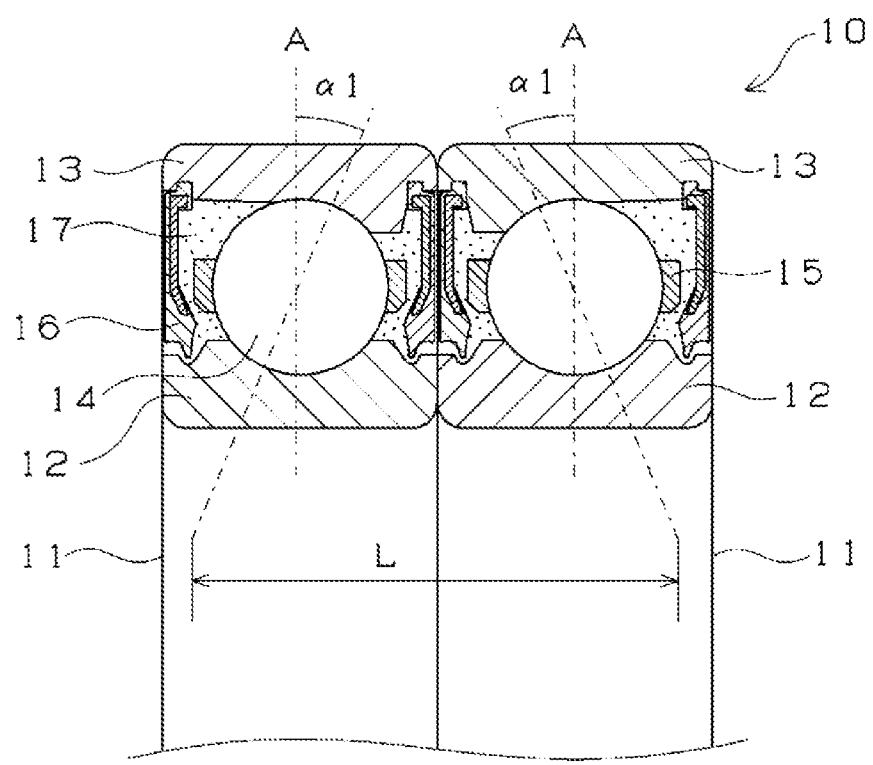
FIG. 2 is a sectional view showing a matched angular contact ball bearing.

The grease-sealed bearing of the present invention may be used in, for example, a robot joint. As a robot joint bearing, for example, a matched angular contact ball bearing can be employed. The grease-sealed bearing of the present invention applied to the matched angular contact ball bearing is described with reference to FIG. 2. FIG. 2 shows a back-to-back matched angular contact ball bearing in which two grease-sealed single-row angular contact ball bearings with seals are combined with their back faces aligned. Hereinafter, the back-to-back matched angular contact ball bearing may be also referred to as an "angular contact ball bearing DB set". Each of single-row angular contact ball bearings 11 that form the angular contact ball bearing DB set 10 includes an inner ring 12, an outer ring 13, a plurality of rolling elements 14 and a cage 15. Each of the inner ring 12 and the outer ring 13, and the rolling element 14 are in contact with each other at a specified angle $\alpha 1$ (contact angle) relative to a radial central line A, and thus the single-row angular contact ball bearing 11 can support the radial load, and the axial load in a single direction. A seal member 16 is fixed to the outer ring 13 and a grease composition 17 is sealed around at least the rolling elements 14.

In the angular contact ball bearing DB set 10, a pair of the single-row angular contact ball bearings 11 is fixed with the back faces of each of the inner rings 12 and the outer rings 13 aligned. With this, the angular contact ball bearing DB set 10 supports the radial load, and the axial load in both directions. The angular contact ball bearing DB set 10 has an action-point distance L longer than that in a bearing that combines non-angular contact ball bearings, so that the angular contact ball bearing DB set 10 is superior in supporting a moment load. Thus, the grease-sealed bearing having this configuration is especially suitable to a robot joint bearing that supports various loads such as the radial load, the axial load and the moment load.

FIGS. 1 and 2 show the ball bearing as an example of the bearing, however in addition to the ball bearing, the grease-sealed bearing of the present invention may be also used as a cylindrical roller bearing, a tapered roller bearing, a self-aligning roller bearing, a needle roller bearing, a thrust cylindrical roller bearing, a thrust tapered roller bearing, a thrust needle roller bearing, or a thrust self-aligning roller bearing.

Example

The present invention is described with reference to Examples and Comparative examples, however the grease-sealed bearing of the present invention is not limited to Examples and Comparative examples.

Seven grease compositions shown in Table 1 were prepared. Each of the grease compositions of Examples 1 and 2 contains the calcium sulfonate complex soap as the thickener and has the worked penetration of grade 1 (310-340).

(1) Fretting Wear Resistance Test

The fretting wear resistance of each of the seven grease compositions was executed by using a Fafnir fretting wear tester. The test condition is based on ASTM D 4170. Specifically, the sealed grease amount is 1±0.05 g, and the test was executed by driving a motor in the atmosphere at a room temperature with an oscillation angle of 12 degrees and an oscillation cycle of 30 Hz. The fretting wear resistance was evaluated based on a mass reduction amount (hereinafter, referred to as a wear amount) of the raceway ring after the test.

The evaluation was executed in following two levels of the load conditions. The first level is based on ASTM D4170 such that the contact surface pressure is 1,700 MPa (hereinafter, referred to as a low surface pressure). The second level is assumed to a high moment load such that the contact surface pressure is 3,000 MPa (hereinafter, referred to as a high surface pressure).

The test result of the fretting wear resistance is shown in FIGS. 3(a) and 3(b) and Table 1. FIGS. 3(a) and 3(b) show relations between the wear amount and the worked penetration based on the tests executed three times using each grease composition. FIG. 3(a) shows a result of the low surface pressure condition. FIG. 3(b) shows a result of the high surface pressure condition. The reference lines in FIGS. 3(a) and 3(b) were determined based on the grease that does not cause the fretting wear in an actual use condition (a condition in which the bearing oscillates such that a rotational direction of the bearing changes while accelerating and decelerating).

Each field of the low surface pressure and the high surface pressure in a Fafnir test wear amount in Table 1 shows the result of the fretting wear resistance determined whether or not an average of the wear amount of the tests executed three times in each condition exceeds a specified threshold.
  ○: reference line or less
  x: reference line or more
(2) Bearing Sealing Performance Test The bearing oscillation test less than the critical oscillation angle (the critical oscillation angle of 44.8 degrees) was executed three times on each grease-sealed angular contact ball bearing DB set with seals (bearing inner diameter of 6 mm) in which each of the seven grease compositions was sealed. Whether or not the grease leaks in each test was visually checked.

The test result of the bearing sealing performance is shown in Table 1. The bearing sealing performance is determined based on whether or not the leakage of the grease is seemingly checked from the bearing after the bearing oscillation test.

According to the result shown in Table 1, the leakage of the grease did not occur in Examples 1 and 2 and Comparative examples 1, 3 and 5. Thus, it is found that the grease that has the worked penetration of grade 2 (265-295) or contains the calcium sulfonate complex soap as the thickener shows superior bearing sealing performance.

Example 2 and Comparative example 2 have the same configuration in the base oil, which is the synthetic hydrocarbon oil, and the same worked penetration, however Comparative example 2 that contains the urea compound as the thickener is inferior in the sealing performance compared to Examples 2 that contains the calcium sulfonate complex soap. It has been known that the calcium sulfonate complex soap as the thickener is low in thixotropy when the shear stress is applied thereto, and is low in change of the cone penetration of the grease (Non-Patent Document 1). Thus, by employing the calcium sulfonate complex soap as the thickener, the change of the cone penetration of the

TABLE 1

| | Example | | Comparative example | | | | |
|---|---|---|---|---|---|---|---|
| | 1 | 2 | 1 | 2 | 3 | 4 | 5 |
| Thickener Kind | Calcium sulfonate complex soap | Calcium sulfonate complex soap | Calcium sulfonate complex soap | Urea compound | Urea compound | Lithium soap | Lithium soap |
| Base oil Kind | Mineral oil | Synthetic hydrocarbon oil | Mineral oil | Synthetic hydrocarbon oil | Mineral oil | Mineral oil | Mineral oil |
| Viscosity of base oil at 40° C. (mm²/s) | 100 | 30 | 100 | 47 | 109 | 220 | 220 |
| Worked penetration 25° C., 60-stroke based on JIS K 2220 | Grade 1 (310-340) | Grade 1 (310-340) | Grade 2 (265-295) | Grade 1 (310-340) | Grade 2 (265-295) | Grade 0 (355-385) | Grade 2 (265-295) |
| Fafnir test wear amount | | | | | | | |
| Low surface pressure | ○ | ○ | x | ○ | ○ | ○ | x |
| High surface pressure | ○ | ○ | x | x | x | ○ | x |
| Bearing sealing performance test | | | | | | | |
| Leakage of grease | ○ | ○ | ○ | x | ○ | x | ○ |

○: grease does not leak in all bearings
x: grease leaks in one bearing or more

Figure 3:
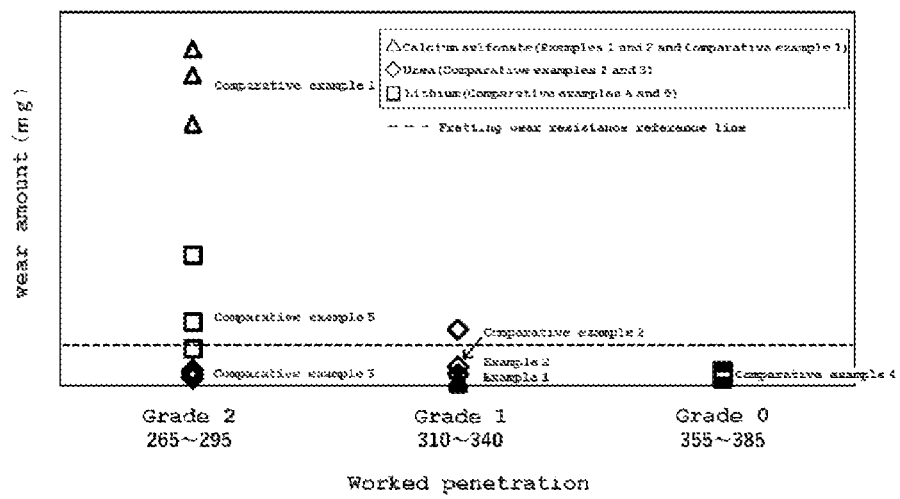
FIGS. 3 (a) and 3 (b) are evaluation results of a fretting wear resistance.
Figure 3:
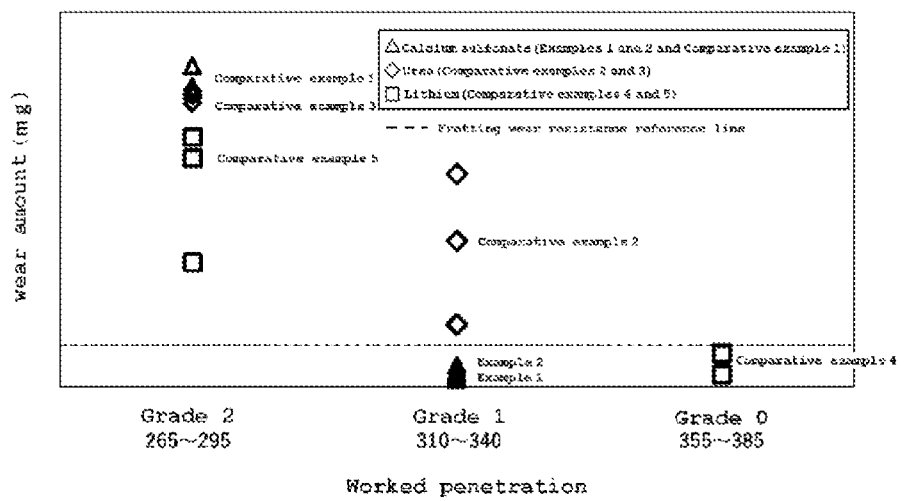
Figure 4:
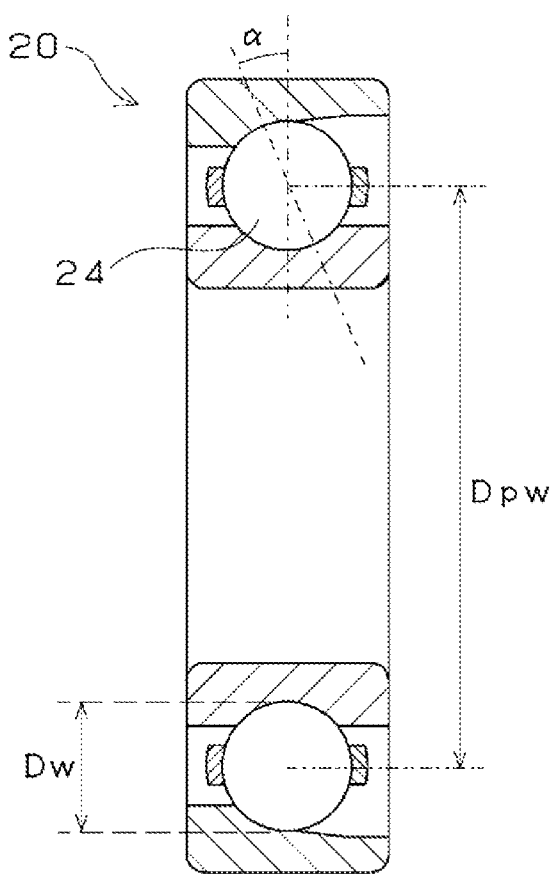
FIG. 4 is a simple sectional view of an angular contact ball bearing.

According to the result shown in FIGS. 3 (*a*) and 3(*b*), it is found that the wear amount is reduced as the worked penetration becomes larger, so that the fretting wear resistance is improved. In a case in which the load condition is the high surface pressure condition, the wear amount is generally apt to be large, compared to the low surface pressure condition. Even in the high surface pressure condition, since the wear amount of each of Examples 1 and 2 and Comparative example 4 is relatively low, the grease that contains the metal soap group (calcium sulfonate complex soap or lithium soap) as the thickener and has the worked penetration of 310 or more can reduce the wear amount and show superior fretting wear resistance.

grease is less in driving, compared to the other thickener, and superior sealing performance is obtained in relatively high worked penetration even in non-driving.

As described above, summarizing the results of the fretting wear resistance test and the bearing sealing performance test, each Examples 1 and 2 shows superior fretting wear resistance and superior sealing performance. As a result, the grease that employs the calcium sulfonate complex soap as the thickener, contains the mineral oil or the synthetic hydrocarbon oil as the base oil, and has the worked penetration of 310-340 is effective to obtain both of the fretting wear resistance and the sealing performance.

INDUSTRIAL APPLICABILITY

The grease-sealed bearing of the present invention is superior in flowability of the grease into the raceway surface, hardly causes the increase of the worked penetration in oscillating of the bearing, and forms the thickener film that is superior in load resistance, so that the grease-sealed bearing is superior in the fretting wear resistance and the sealing performance. The grease-sealed bearing can be used under an oscillation condition with acceleration and deceleration, in particular favorably used as a robot joint bearing.

REFERENCE SIGNS LIST

1: grease-sealed bearing
2, 12: inner ring
2a: inner ring raceway surface
3, 13: outer ring
3a: outer ring raceway surface
4, 14: rolling element
5, 15: cage
6, 16: seal member
7, 17: grease composition
8a, 8b: opening
10: angular contact ball bearing DB set
11, 20: single-row angular contact ball bearing
24: ball

The invention claimed is:

1. A grease-sealed bearing comprising:
an inner ring and an outer ring that are raceway rings;
a plurality of rolling elements that is interposed between the inner ring and the outer ring; and
a grease composition that is sealed around the rolling elements,
the bearing being configured to oscillate such that a rotational direction of the bearing changes while accelerating and decelerating,
wherein:
the grease composition contains a base oil and a thickener,
the worked penetration of the grease composition is 310 or more, and
the thickener is a calcium sulfonate complex soap.

2. The grease-sealed bearing as defined in claim 1, wherein the grease-sealed bearing is used under a high load condition in which the maximum contact surface pressure on the raceway ring is 2,000 MPa or more and under a condition less than a critical oscillation angle.

3. The grease-sealed bearing as defined in claim 1, wherein the worked penetration is in a range of 310-340.

4. The grease-sealed bearing as defined in claim 1, wherein the base oil is a mineral oil or a synthetic hydrocarbon oil.

5. The grease-sealed bearing as defined in claim 1, wherein the grease-sealed bearing is configured as an angular contact ball bearing.

6. The grease-sealed bearing as defined in claim 1, wherein the grease-sealed bearing is configured as a robot joint bearing.

* * * * *